Oct. 23, 1962    S. L. EIFRID    3,059,763
REEL ASSEMBLY AND METHOD OF CONSTRUCTING SAME
Filed March 17, 1958    9 Sheets-Sheet 1
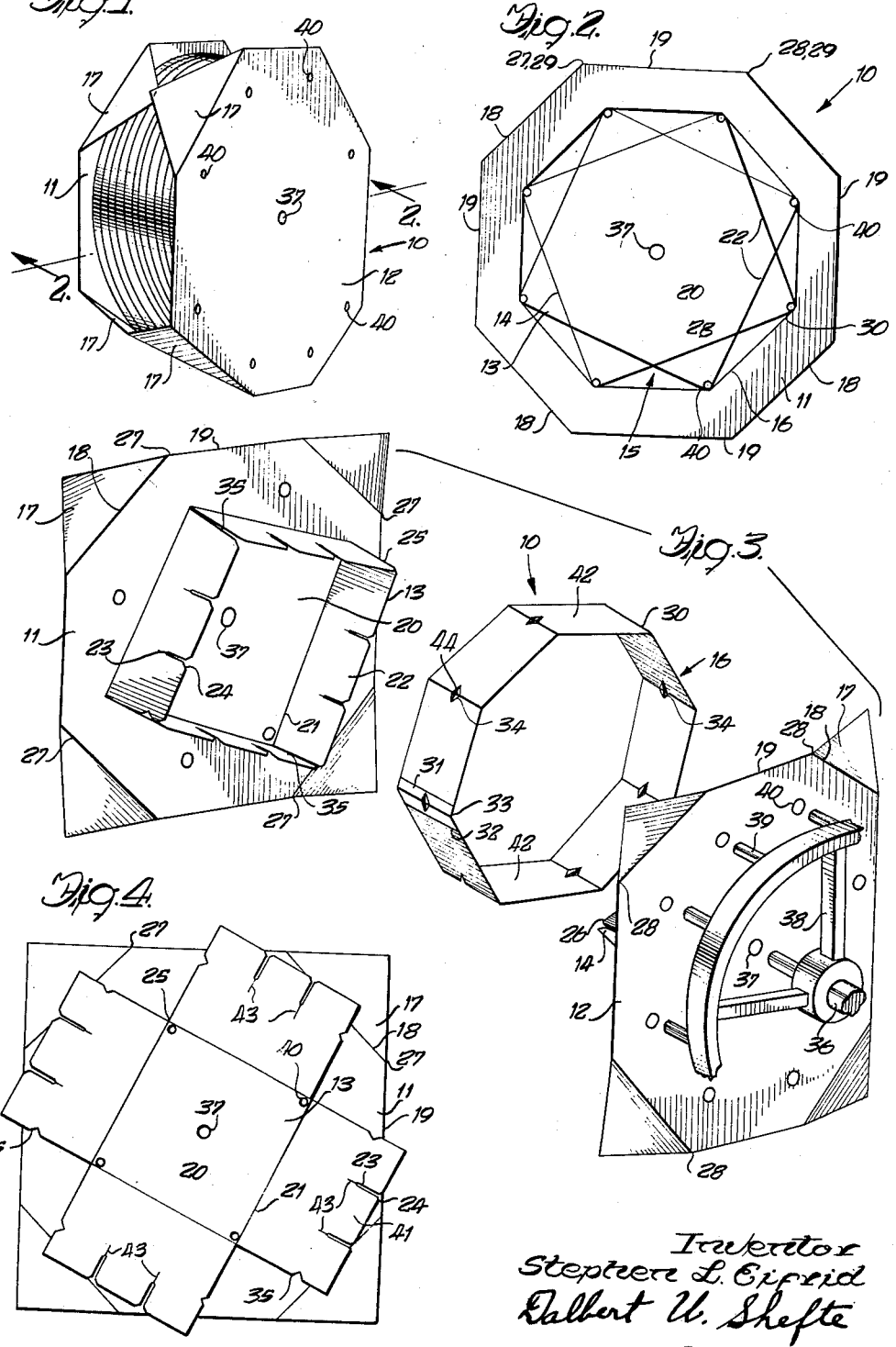

Oct. 23, 1962 S. L. EIFRID 3,059,763
REEL ASSEMBLY AND METHOD OF CONSTRUCTING SAME
Filed March 17, 1958 9 Sheets-Sheet 2
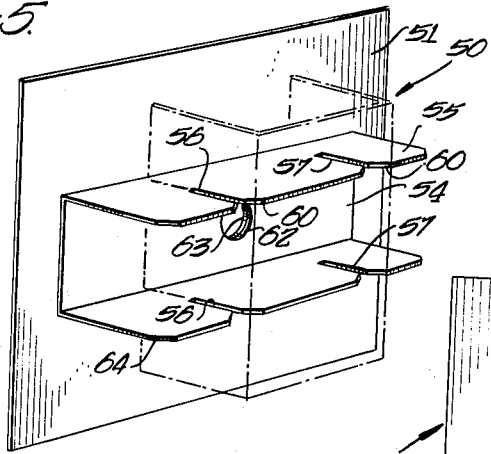
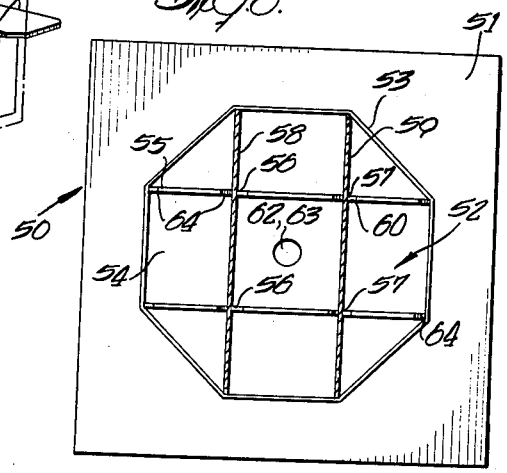
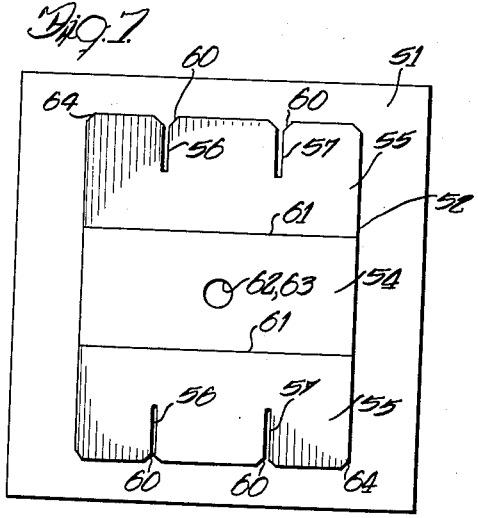
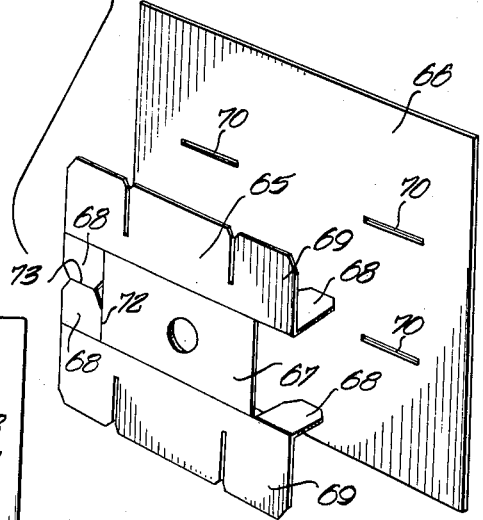
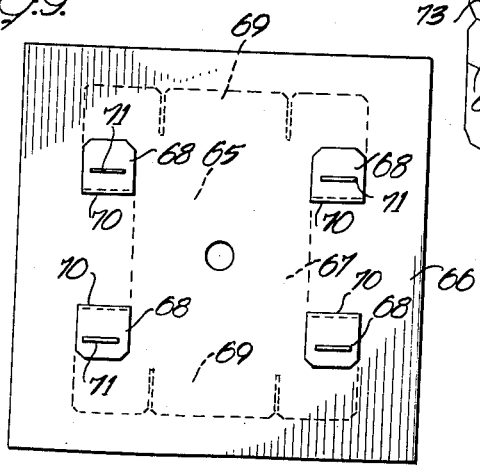
Inventor
Stephen L. Eifrid
Dalbert U. Shefte
Attorney

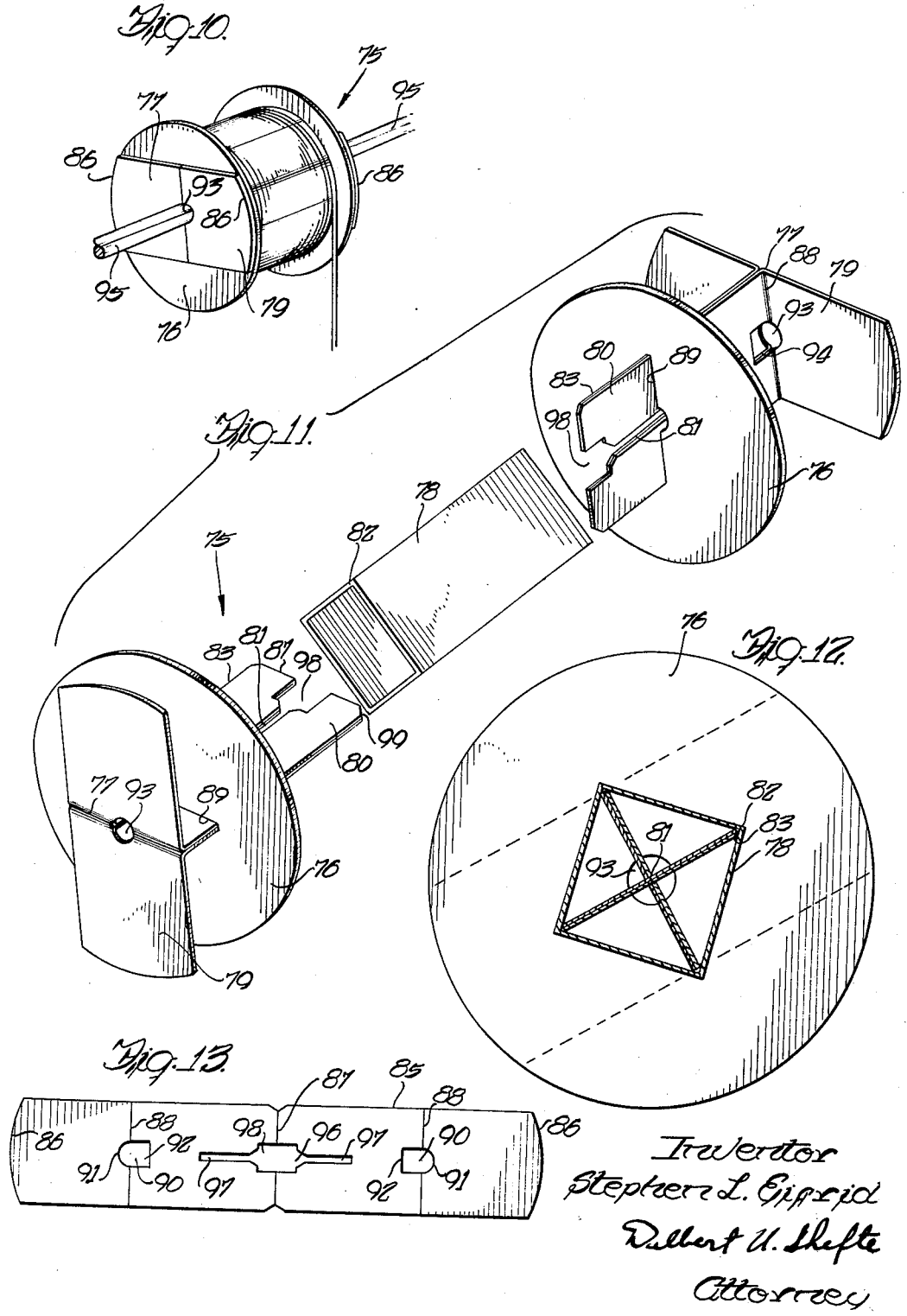

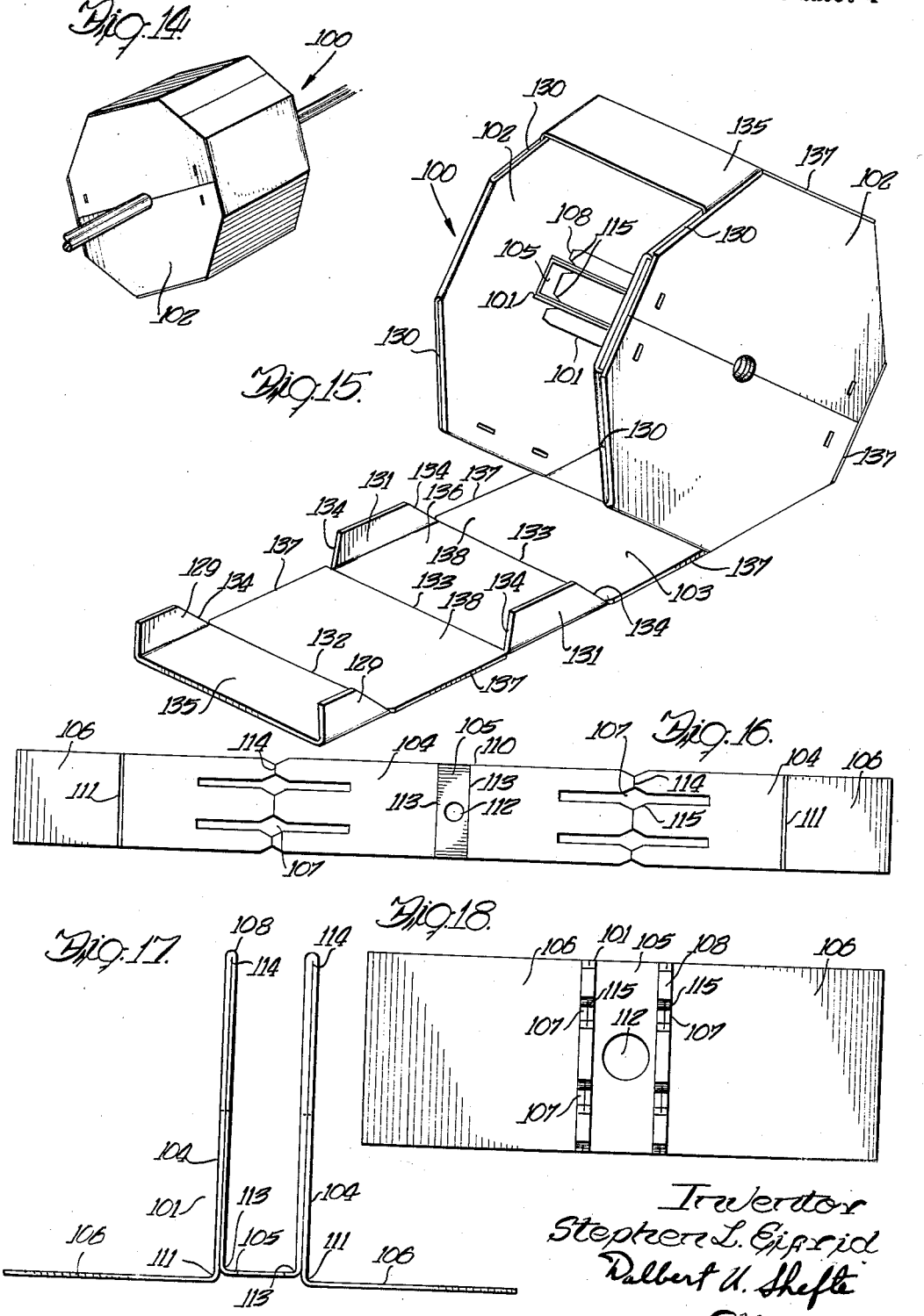

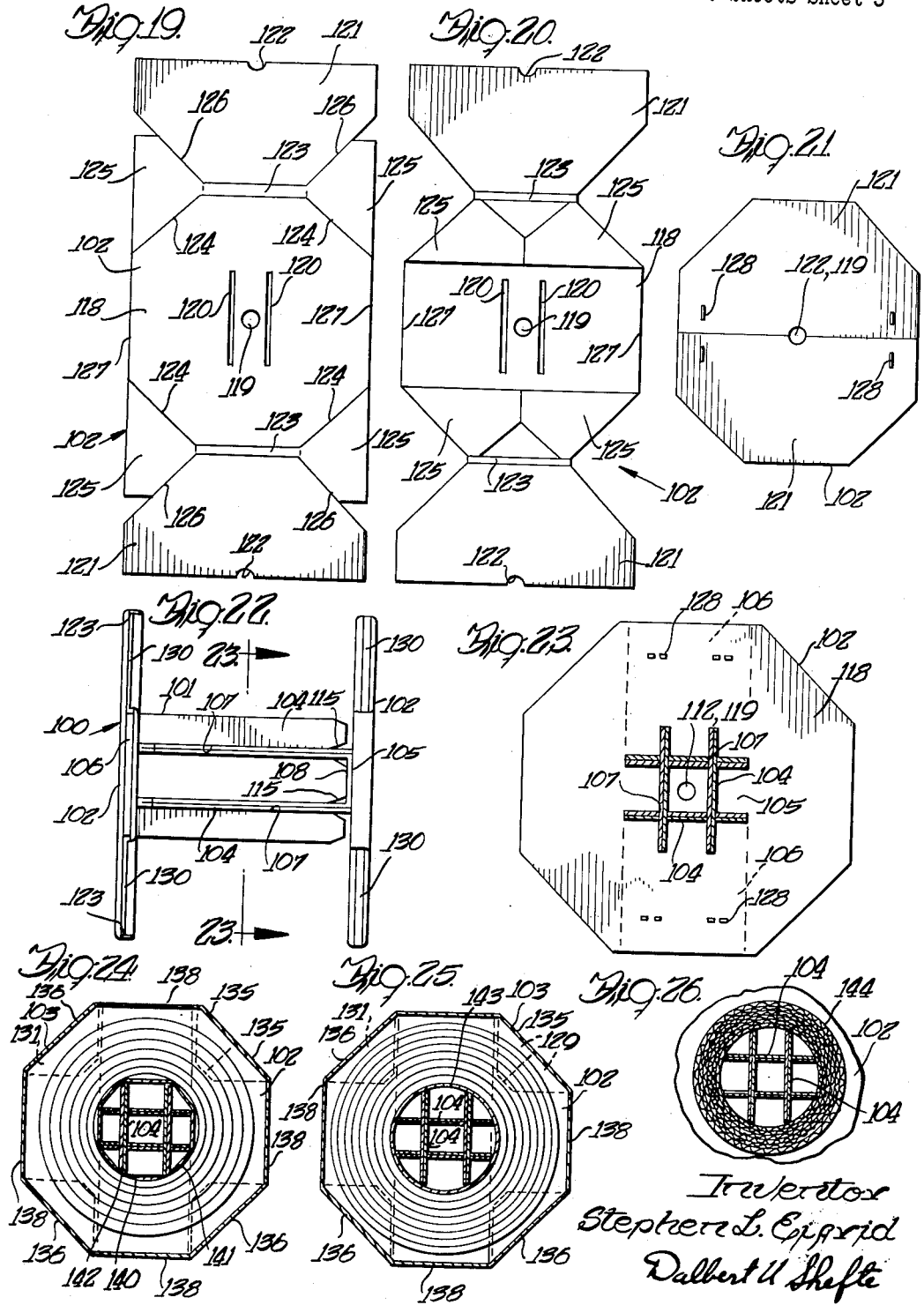

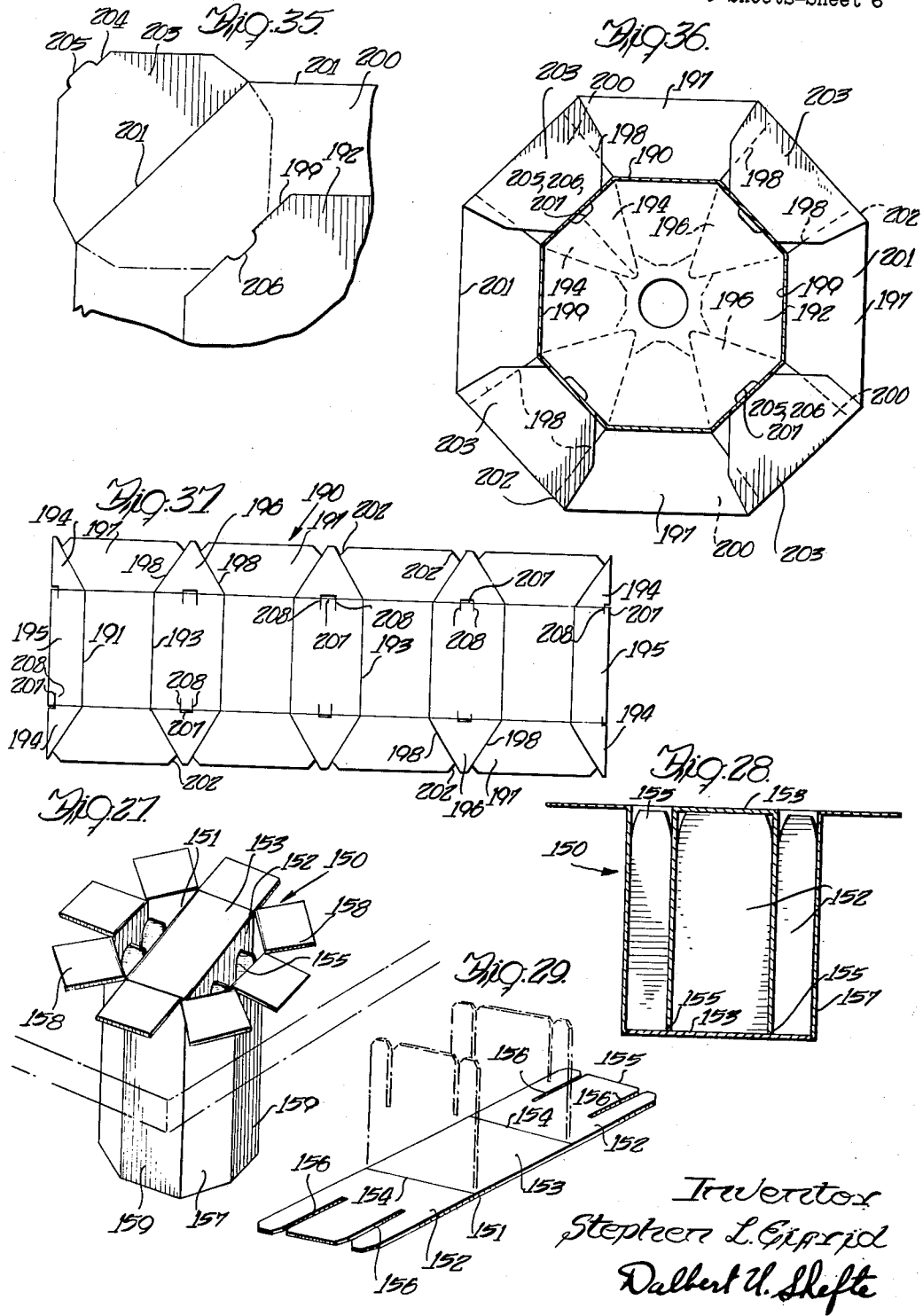

Oct. 23, 1962 S. L. EIFRID 3,059,763
REEL ASSEMBLY AND METHOD OF CONSTRUCTING SAME
Filed March 17, 1958 9 Sheets-Sheet 7
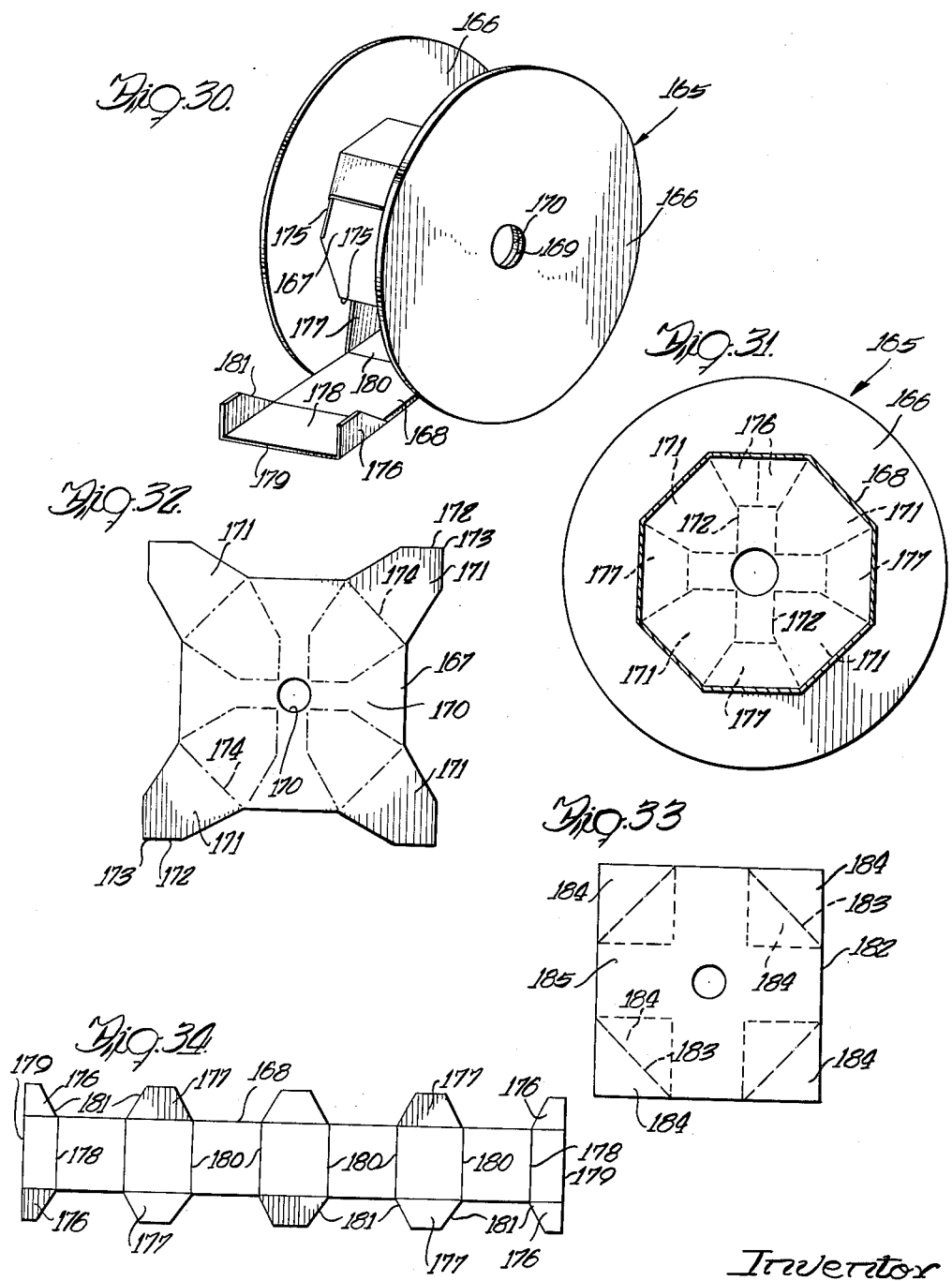
Inventor
Stephen L. Eifrid
Dalbert U. Shefte
Attorney Oct. 23, 1962 S. L. EIFRID 3,059,763
REEL ASSEMBLY AND METHOD OF CONSTRUCTING SAME
Filed March 17, 1958 9 Sheets-Sheet 8
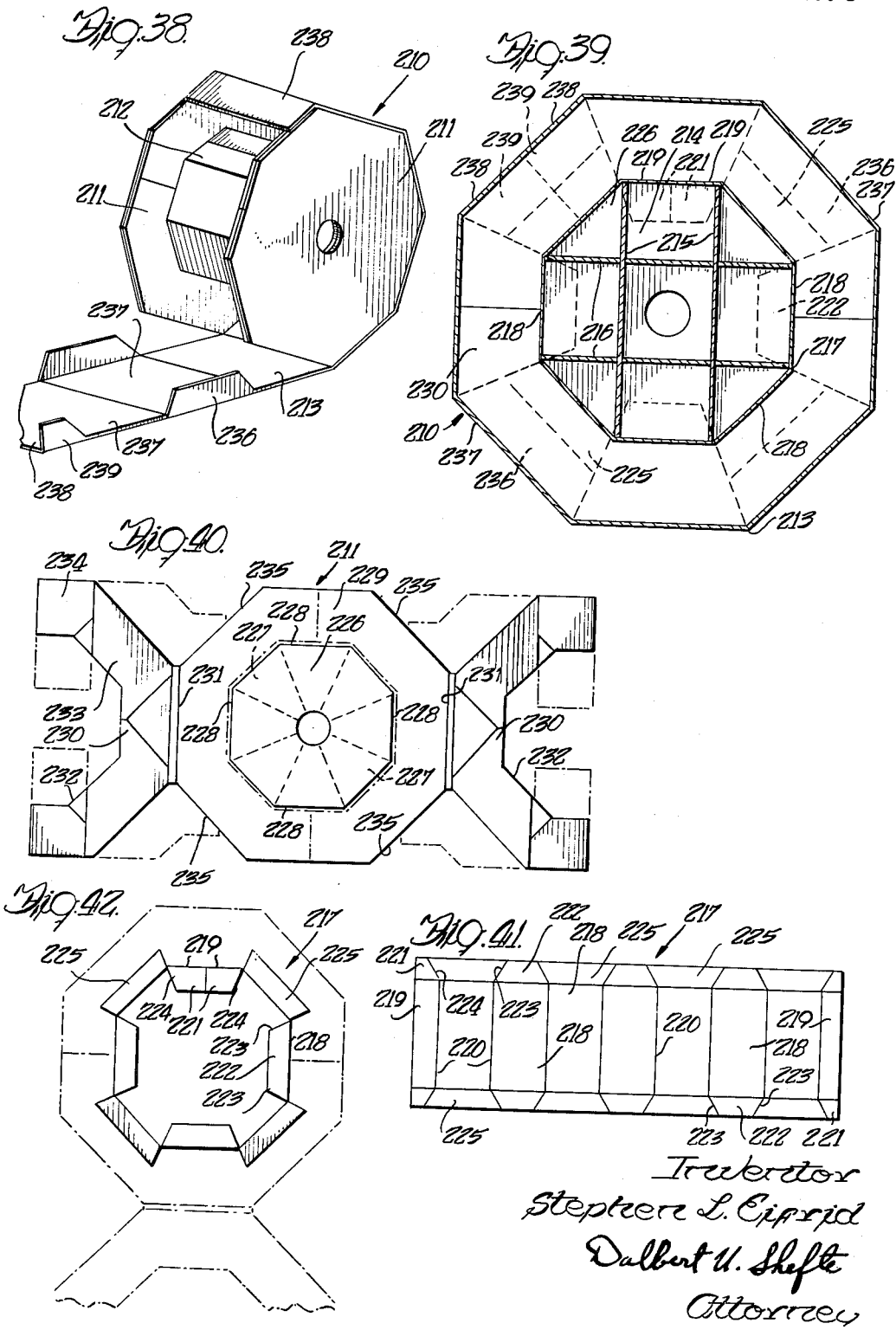
Inventor
Stephen L. Eifrid
Dalbert U. Shefte
Attorney Oct. 23, 1962 S. L. EIFRID 3,059,763
REEL ASSEMBLY AND METHOD OF CONSTRUCTING SAME
Filed March 17, 1958 9 Sheets-Sheet 9

Inventor
Stephen L. Eifrid
Dalbert U. Shefte
Attorney

United States Patent Office 3,059,763
Patented Oct. 23, 1962

3,059,763
REEL ASSEMBLY AND METHOD OF CONSTRUCTING SAME
Stephen L. Eifrid, 5376 Kimball Place, Oak Lawn, Ill.
Filed Mar. 17, 1958, Ser. No. 722,097
23 Claims. (Cl. 206—59)

This invention relates to a reel assembly and method of constructing same and more particularly to a reel assembly formed of interlocking parts and method of constructing same. This application is a continuation-in-part of my co-pending application entitled "Reel Assembly and Method of Constructing Same," Serial No. 618,356, filed October 25, 1956, now abandoned.

The reel in its basic form has been in existence for centuries and flexible materials such as thread, line, rope, wire and flexible pipe have long been wound on reels for packaging, storing and handling. These reels commonly have been made of wood and metal, and little structural changes have resulted over the years even though many changes have been desirable for more economical application to old uses and to cope with the many new uses.

An example of a desired change is apparent in the modern trend in industry to improve material handling costs and procedures by reducing the cost of the material, minimizing the essential steps to assemble, and reducing the overall weight. In the case of packaging flexible materials such as plastic hose on reels where a large easily assembled disposable reel is required and maximum strength is not necessary, attempts have been made to use corrugated paper board.

The use of corrugated paper board permits precutting of flat pieces which can be shipped flat to a user for folding and assembly on the job site. This provides compact lightweight shipping, and, because of the low cost of corrugated paper board, provides an economically disposable reel.

Previous constructions utilizing corrugated paper board have the disadvantages of requiring time-consuming operations to assemble and several gluing, stitching (stapling) or taping operations which waste man hours and raise the cost of packaging by the user. Further, the previous constructions require added members to give strength to the center of the reel to prevent tearing of the reel when mounted on a shaft.

The present invention overcomes the above disadvantages by providing an interlocking structure assembled from flat precut pieces which can be shipped flat to a user who folds the pieces along scoring and simply assembles the reel by interlocking the support members. Further, a band surrounds the framework formed by the interlocking support members and provides a core upon which flexible material may be wound. Thus there is no painstaking operation required of the user, no gluing, stitching or taping and yet the framework provides the necessary support for a fully wound reel.

The core constructions of this invention can be utilized for many structural purposes other than for reel assemblies. Thus, load-bearing members embodying the present invention can be used as spacers, as vertical supports for objects such as pallets or as supporting legs for other objects as furniture or the like.

The present invention further includes the construction of a cover encircling the periphery of the reel heads and extending therebetween so as to enclose the product. This forms a compact and inexpensive complete package which requires no additional container for shipping and storing. The cover is simply folded around the periphery of the heads in engagement therewith and the ends of the cover are gued, stitched, or taped together to secure the cover in place. The cover not only serves to enclose the product, but also supports the outer edges of the reel, thereby increasing the strength and rigidity of the reel.

It is further contemplated by the present invention that the supporting feature of the cover construction can be utilized as a core with or without additional supporting members. Thus, a construction similar to the cover forms a core drum which is attached to heads to form a reel assembly upon which a product may be wound. This core drum construction requires a minimum of material and is interlocked with the heads to form a rigid construction.

It is the general object of this invention to provide a new and improved reel assembly and method of constructing same.

Another object of this invention is to provide a new and improved reel assembly with interlocking parts.

A further object of this invention is to provide a new and improved reel assembly constructed of corrugated paper board.

Still another object of this invention is to provide a new and improved reel assembly that is easily constructed from precut pieces.

Yet another object of this invention is to provide a new and improved reel assembly having complementary support members each having a slotted flange extending therefrom for interlocking engagement with a slotted flange of the other support member to form a rigid framework.

A still further object of this invention is to provide a reel assembly of the type described having support members each having a plurality of sides with slots therein so that the support members can be interlocked by interengagement of the slots to form a framework.

Yet another object of this invention is to provide a reel assembly of the type described having a polygonal band mounted around the framework upon which flexible material can be wound.

Yet a further object of this invention is to provide a reel assembly of the type described wherein the interlocking support members have square bases secured to end pieces and have four slotted sides arranged for assembly so that the sides will intersect the sides of the other support member to form an eight-cornered interlocking framework.

And another object of this invention is to provide a reel assembly as described in the preceding paragraph wherein each support member is formed from two pieces each having a base and two slotted sides, the two sides having their bases superimposed and secured together to form a four-sided support member having a double thickness base.

A further object of the present invention is to provide a reel assembly having spaced heads with core pieces attached to each head, each core piece having a slotted flange which engages a similar slotted flange of the other core piece, and a peripheral cover attached to and extending between the heads to form a complete reel assembly package.

Still another object of the present invention is to provide a reel assembly having a peripheral cover attached to the outer edges of the spaced heads of the reel assembly and extending therebetween so that the heads and cover form a complete compact package.

A still further object of the present invention is to provide a new and improved reel assembly with support members secured to the spaced heads, and a core drum having flaps attached in cavities formed between the core heads and the support members.

Yet another object of the present invention is to provide a new and improved reel assembly having spaced heads and a core drum of rigid material formed in sections with the sections having tabs which engage in cavities to attach the drum heads and the core together to form a reel assembly.

And yet another object of the present invention is to provide a new and improved method of constructing reel assemblies of the preceding paragraphs from flat pieces of corrugated paper board.

Other and further objects and advantages of the present invention will be apparent from the following description and drawings of which:

FIGURE 1 is a perspective view of a reel constructed according to one embodiment of this invention showing flexible pipe wound thereon;

FIG. 2 is a vertical sectional view taken along lines 2—2 of FIG. 1;

FIG. 3 is an exploded view of the device of FIG. 1;

FIG. 4 is a view of an end piece and an unfolded support member of the device of FIG. 1;

FIG. 5 is a perspective view of a portion of a reel assembly which is a first variation of the construction of FIGS. 1 through 4;

FIG. 6 is a vertical sectional view of the reel assembly of FIG. 5;

FIG. 7 is a side elevational view of the same portion of the reel assembly illustrated in FIG. 5, but in the unfolded position;

FIG. 8 is an exploded perspective view of the reel assembly of FIG. 7 illustrating an alternate means of attaching the core piece to the head;

FIG. 9 is an end elevational view of a reel assembly of the construction of FIG. 8;

FIG. 10 is a perspective view of a reel assembly illustrating a second variation of the construction of FIGS. 1 through 4 with the assembly mounted on a shaft and having a product wound thereon;

FIG. 11 is an exploded perspective view of the reel assembly of FIG. 10;

FIG. 12 is a vertical sectional view of the reel assembly of FIG. 10;

FIG. 13 is a plan view of an unfolded core piece of the reel assembly of FIG. 10;

FIG. 14 is a perspective view of a reel assembly illustrating a third variations of the construction of FIGS. 1 through 4 and including a peripheral cover;

FIG. 15 is a perspective view of the reel assembly of FIG. 14 showing the cover partially removed;

FIG. 16 is a plan view of an unfolded core piece of the reel assembly of FIG. 14;

FIG. 17 is a side elevational view of a folded core piece of the reel assembly of FIG. 14;

FIG. 18 is a top plan view of the folded core piece of FIG. 17;

FIG. 19 is a plan view of an unfolded head of the reel assembly of FIG. 14 which is scored and cut preparatory to folding;

FIG. 20 is a plan view similar to FIG. 19 with the head partially folded;

FIG. 21 is a plan view of the head of FIG. 20 completely folded;

FIG. 22 is a front elevational view of the reel assembly of FIG. 14 with the cover removed;

FIG. 23 is a vertical sectional view taken along line 23—23 of FIG. 22;

FIG. 24 is a vertical sectional view of the reel assembly of FIG. 14 illustrating an octagonal core band with product wound thereon;

FIG. 25 is a vertical sectional view similar to FIG. 24 illustrating a cylindrical core band;

FIG. 26 is a vertical sectional view similar to FIG. 24 and partially broken away illustrating a multi-layer cylindrical core band;

FIG. 27 is a perspective view of a load-bearing member identical to the core construction of the present invention, the load-bearing member being attached to and supporting a pallet;

FIG. 28 is a vertical sectional view of the load-bearing member of FIG. 27;

FIG. 29 is a perspective view of one unfolded core piece of the construction of FIG. 27 illustrating the folded position in dot-dash lines;

FIG. 30 is a perspective view of a fourth variation of the reel assembly illustrated in FIGS. 1 through 4 which consists of a core drum secured to the reel heads, with the drum partially unwound;

FIG. 31 is a vertical sectional view of the reel assembly of FIG. 30;

FIG. 32 is a plan view of an unfolded support member of the reel assembly of FIG. 30 illustrating the folded position in dot-dash lines;

FIG. 33 is a plan view of an alternate construction of a support member for the reel assembly of FIG. 30;

FIG. 34 is a plan view of the unfolded core drum of the reel assembly of FIG. 30;

FIG. 35 is an enlarged plan view of a portion of a reel assembly similar to the reel assembly of FIGS. 30 through 34 and illustrating an alternate construction;

FIG. 36 is a vertical sectional view of the reel assembly of FIG. 35;

FIG. 37 is a plan view of the unfolded core drum of the reel assembly of FIG. 35;

Figure 43:
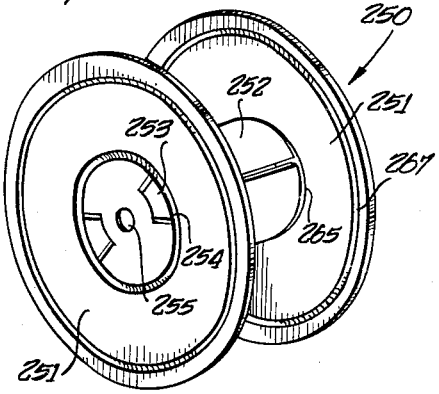
Figure 44:
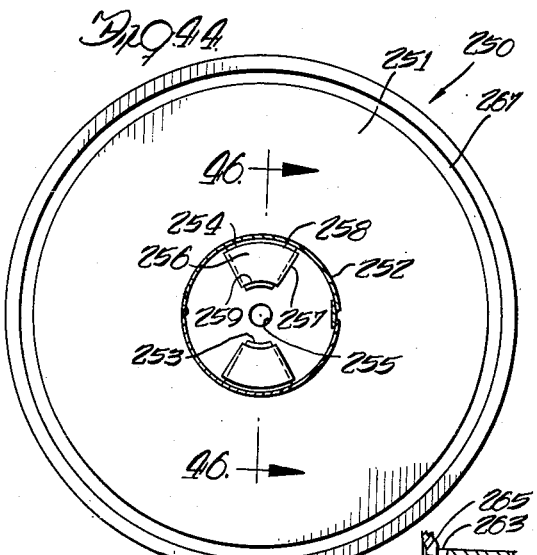
Figure 45:
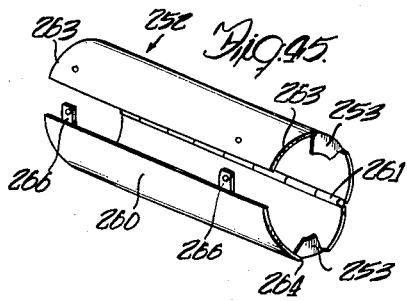
Figure 46:
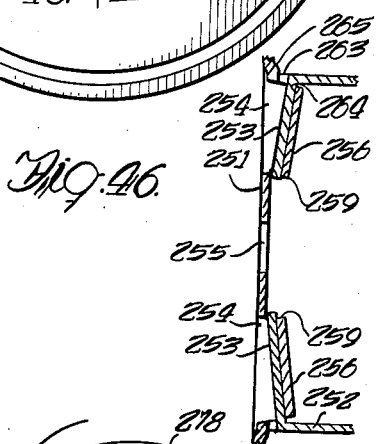
Figure 47:
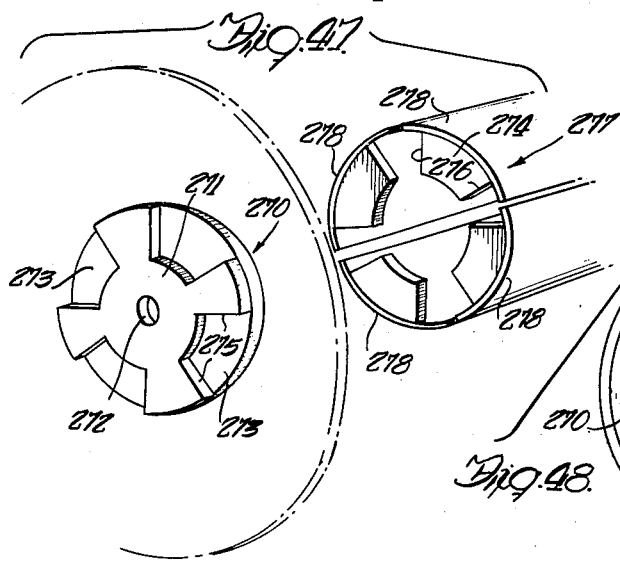
Figure 48:
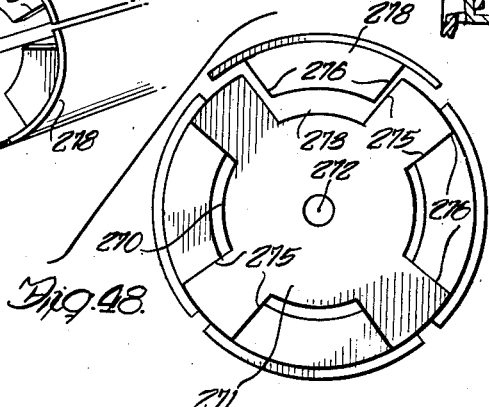

FIG. 38 is a perspective view of a reel assembly similar to the reel assembly of FIGS. 30 through 34 illustrating a second alternate construction which includes an interior core similar to that of FIGS. 5 through 7 and a cover similar to that of FIGS. 14 and 15;

FIG. 39 is a vertical sectional view of the reel assembly of FIG. 38;

FIG. 40 is a side elevational view of a partially folded head of the reel assembly of FIG. 38 with a support member attached thereto;

FIG. 41 is a plan view of the unfolded core barrel of the reel assembly of FIG. 38;

FIG. 42 is an end view of the folded core barrel of the reel assembly of FIG. 38;

FIG. 43 is a perspective view of a fifth variation of the reel assembly illustrated in FIGS. 1 through 4;

FIG. 44 is a vertical sectional view of the reel assembly of FIG. 43;

FIG. 45 is a perspective view of the core drum of the reel assembly of FIG. 43 showing the core drum partially open;

FIG. 46 is an enlarged vertical sectional view taken along line 46—46 of FIG. 44;

FIG. 47 is an exploded perspective view of a support member and core drum of an alternative reel assembly in which the core drum is formed in four sections; and FIG. 48 is an end view of the elements of FIG. 47 showing the core drum partially mounted on the support member.

While this invention is susceptible of embodiments in many different forms there is shown in the drawings and will herein be described in detail several embodiments with the understanding that the present disclosure is to be considered as an exemplification of the principles of the invention and is not intended to limit the invention to the embodiment illustrated. The scope of the invention will be pointed out in the appended claims.

The various embodiments illustrated in the drawings and described herein are continuations and variations of the construction described and illustrated in my original application No. 618,356, filed October 25, 1956, incorporated in its entirety herein. The identical drawings of the original application form FIGS. 1 through 4 of the present continuation application.

The construction illustrated and described in the original application and in FIGS. 1 through 4 herein will hereafter be referred to as embodiment "A"; the variation illustrated in FIGS. 5 through 9 shall be referred to as embodiment "B"; the variation illustrated in FIGS. 10 through 13 will be referred to as embodiment "C"; the variation illustrated in FIGS. 14 through 26 will be referred to as embodiment "D"; the variation illustrated in FIGS. 27 through 29 will be referred to as embodiment "E"; the variation illustrated in FIGS. 30 through 42 will be referred to as embodiment "F"; and the embodiment illustrated in FIGS. 43 through 48 will be referred to as embodiment "G."

Embodiment "A," which constitutes the construction illustrated in the original application will first be described. In FIGS. 1 through 4 a reel generally indicated as 10 is formed from two flat end pieces 11 and 12 to which two support members 13 and 14 are secured. The support members interlock, as shown in FIG. 2, to form a framework 15 which is surrounded by a polygonal band 16 upon which flexible material may be wound.

It is of course apparent that the reel assembly of this invention can be constructed from any desired material, however, for clarity of description the following is directed to the use of corrugated paper board.

The end pieces 11 and 12 are formed from flat square pieces which have their corners 17 foldable inwardly along scored diagonals 18, each diagonal being the same length as the unfolded edge 19 of the end pieces intermediate the foldable corners. Thus, when the corners are folded, the end pieces have octagonal peripheries.

The support members 13 and 14, which interlock to form the framework 15, have square bases 20 with scored edges 21 from which rectangular sides 22 extend and are foldable to be perpendicular to the base 20. Each side 22 is provided with two open-ended slots 23 which may be provided with widened open ends 24 for ease of assembly. These slots 23 are perpendicular to the base 20 and are spaced to engage similar slots on the other support member to interlock the support members and form the framework 15. To accomplish this interengagement, the slots are arranged so that each one is equidistant from the other slot on the same side and from the nearest slot on the adjacent side. If desired, the slots 23 may have slit portions 43 extending inwardly therefrom for frictional engagement when forced into engagement with the complementary slit portions 43 on the other support member.

The bases 20 of the support members 13 and 14 are contiguous with and secured as by gluing or stitching to end pieces 11 and 12, respectively, being concentric therewith and aligned with corners 25 and 26 of the respective support members 13 and 14 pointing to alternate corners 27 and 28 of the end pieces 11 and 12. The support members thus interlocking to form the framework 15 having eight outstanding corners 29 aligned with the corners of the end pieces.

The octagonal band 16 which surrounds the eight-cornered framework 15 and extends between end pieces 11 and 12 has corners 30 contiguous with corners 25 and 26 of the framework 15 and serves as a mounting upon which flexible material such as plastic pipe or the like can be wound. It is formed from a length of flat corrugated paper board scored and folded into octagonal shape with the two ends 31 and 32 secured together as with tape 33 and fits closely around the framework 15 to assist in locking the support members 13 and 14 in position. Also if desired, notches 34 can be formed in the corners of the band as by a slit 44 across the corner which can be pushed in to form the notches 34 which overlie notches 35 cut in the corners of the framework 15 so that when the flexible material is wound on the reel 10, the winding will lay in the notches to further lock the band and support pieces in position.

One of the common uses of the reel of this invention is that of packaging flexible pipe or hose and more particularly packaging plastic pipe as it is continuously extruded from a mold. To receive and wind the pipe on the reel it is mounted on a shaft 36 which extends through the center hole 37 which has been stamped in the end pieces 11 and 12 and the bases 20 of the support members 13 and 14. To insure rotation of the reel upon rotation of the shaft 36 a jig 38 having reel engaging lugs 39 may be axially mounted on the shaft for engagement in lug receiving holes 40 stamped in the reel. These holes 40, of course, can be of any number and position depending on the particular jig structure. However, if the holes 40 are located immediately inside the outstanding corners 29 of the framework 15 and the jig is constructed to engage these holes, a dual purpose will be accomplished. Thus, not only will the holes receive the jig for rotation of the reel, but when securing the support members to the end pieces, the parts can be mounted on lugs of a jig to properly align the parts.

After a sufficient quantity of flexible material has been wound on the reel, the corners 17 of the end pieces 11 and 12 described above can be folded inwardly and secured together by stapling or other means to package the material on the reel and assist in holding the end pieces in their proper relationship.

When the present invention is applied to the construction of a reel assembly from corrugated paper board an inexpensive, cheaply produced, easily assembled, and sufficiently strong reel is produced. Thus, all the parts can be cut from flat sheets of board and folded to the desired configuration. To form the end pieces 11 and 12 squares are cut and diagonally scored to provide foldable corners 17 and the holes 37 and 40 are cut out of the square to accommodate the shaft 36 and jig 38, respectively.

The support members 13 and 14 are die cut from flat sheets to provide square bases 20 and rectangular flanges 41 extending outwardly from each side of the square 20 and the slots 23 and slots 24 described above are cut in the flanges. The square 20 is scored along its edges 21 to facilitate folding of the flanges 41 to form the sides 22.

The octagonal band 16 is formed by cutting a strip of board having a width equal to the desired spacing between end pieces. The strip is scored laterally to form eight equal rectangles 42 having lengths equal to the distance between corners 29 of the framework 15. The strip is then folded along the scoring to form a band and the ends 31 and 32 are secured together as with tape 33.

After the support members 13 and 14 have been secured to the end pieces 11 and 12 by mounting them on an aligning jig and gluing or stitching the bases 20 to the end pieces, all of the parts can be shipped to the user flat for folding and further assembly. Thus, the user simply folds the flange 41 to form the sides 22, mounts the band 16 over one support member and pushes the other support member into engagement with the band and other support member. The reel is then ready for mounting on the shaft and jig. After the desired quantity of plastic pipe or other material has been wound on the reel, the corners 17 of the end pieces 11 and 12 are folded inwardly and stitched together to close the package for storage or shipment.

As described above there is a double thickness of corrugated paper board surrounding the center hole 37 which provides sufficient strength under ordinary loads. However, it may be desirable to increase the strength to prevent tearing under some conditions. This can be done by constructing each support member 13 and 14 from two pieces of board which are cut to have identical square bases and two flanges extending from the opposite sides of the base. These two pieces are then joined with their bases glued or stitched together to form a support member having four sides and a double thickness base resulting in triple thickness at the center of the reel.

From the above it is apparent that the present invention shows a reel assembly which can be easily and simply constructed from a minimum number of parts which interlock to form a rigid reel and which can be constructed from flat pieces of corrugated paper board to form a disposable reel that can be partially assembled and then shipped flat to a user who completes the assembly in a few simple operations. The limited number of parts reduces the weight and cost of producing the reel but the particular assemblage of the parts provides the necessary strength at the center.

A variation of the above construction is contained in embodiment "B" and illustrated in FIGS. 5 through 9. This construction is basically similar to embodiment "A" in that it is a reel assembly 50 consisting of end pieces 51 to which support members or core pieces 52 are secured with the core pieces interlocking somewhat similar to the interlocking of the support members 13 and 14 of embodiment "A." Further the core pieces 52 are surrounded by a band or core drum 53 identical with the band 16 of embodiment "A."

Each core piece 52 consists of a base 54 having a pair of flanges 55 extending from opposite sides of the base in a direction parallel to the axis of the reel assembly 50. Each flange 55 is provided with a pair of spaced slots 56 which are spaced a distance equal to the distance between flanges 55 so that when the core pieces 52 are arranged to intersect at right angles, the slots 56 and 57 of each flange 55 will interengage slots of both flanges 58 and 59 of the other core piece to form a criss-cross framework having eight outsanding points similar to the points of the framework of embodiment "A." The slots 56 and 57 are of a width the same as or slightly less than the thickness of the flanges to produce a friction fit engagement between the flanges and the slots are flared at their outer ends 60 to facilitate initial engagement. The slots extend substantially half the distance across the flanges so that upon interengagement the flanges of one core piece will buttress against the base of the other core piece. The position of the other core piece is illustrated in dot-dash lines in FIG. 5. A core barrel 53 substantially identical to the band 16 of embodiment "A" encircles and rigidly positions the eight outer points of the criss-cross framework, as seen in FIG. 6. The core barrel 53 also serves as a mounting for the receipt of the product to be wound thereon.

Each core piece 52 can be formed from a flat blank of a material such as corrugated paper board. This blank may be cut and scored as in FIG. 7, wherein score lines 61 indicate the sides of the base 54 along which the flanges 55 are folded to extend perpendicular to the base. The slots 56 and 57 with the flared ends 60 may be die cut from the blank as may the center hole 62.

In storing and shipping this reel assembly 50, the heads 51, unfolded core pieces 52, and flat core barrel 53 occupy very little space and thus the entire assembly may be shipped or stored in a flat condition occupying only a fraction of the space occupied when the reel is assembled.

To assemble the reel assembly 50 of FIGS. 5 through 7, the core pieces 52 are secured to the heads 51 as by gluing or stitching their bases 54 to the heads 51 with the center holes 62 of the bases 54 aligned with the center holes 63 of the heads 51. The core barrel 53 is mounted on the folded flanges 55 of one of the core pieces 52 and the flanges of the other core piece are forced into the core drum 53 at right angles to the flanges of the first core piece 52 with the slots 56 and 57 of the first core piece 52 engaging the slots in the flanges 58 and 59 of the other core piece. When the core pieces are fully inserted, the flanges of each core piece are abutting the base of the other core piece. The core pieces are interlocked by the wedging interengagement of the slots and by the frictional fit in the core barrel 53. In order to facilitate the insertion of the flanges into the barrel 53, the corners of the flanges may be tapered as at 64.

FIGS. 8 and 9 illustrate an alternate core piece construction 65 which provides an alternate method of attaching the core piece to the head 66. In FIGS. 8 and 9 it is seen that the core piece 65 is identical to the core piece 52 of FIGS. 5, 6, and 7 except for the pairs of tabs 68 at each end of the base 67. These tabs 68 are formed by slits 72 extending across the base 67 from flange to flange adjacent the end of the base and a longitudinal slit 73 connecting the midpoint of the slit 72 with the end of the base 67. The tabs 68 formed by these slits 72 and 73 may be folded perpendicular to the base 67 so as to extend through complementary slots 70 formed in the head 66 and aligned with the tabs 68. The core piece 65 is attached to the head 66 by inserting the tabs 68 through the slots 70, folding the tabs 68 back so as to lie along the heads 66 and securing the tabs 68 to the heads 66 as by staples 71.

It is seen from the above description that embodiment "B" provides a rigid framework of approximately the same strength and rigidity as the construction of embodiment "A." However, the amount of necessary material is reduced because two of the four flanges 55 are eliminated and the area of the base 54 is reduced as each base is reduced from a square construction as in embodiment "A" to the present rectangular construction wherein the height of the base 54 in FIG. 5 is seen to be considerably less than the width. This saving in material is of importance when the reel assemblies are formed from corrugated paper board in that the cost of the board footage is normally the primary factor in determining the cost of the reel.

Embodiment "C" is another variation of the basic interlocking core framework of embodiment "A" having a similar slotted flange construction.

In FIGS. 10 through 13 a reel assembly 75 is illustrated comprising reel heads 76, core pieces 77 and a core barrel 78. Each core piece 77 consists of a base 79 and a flange 80 extending inwardly perpendicular to the base 79. The flanges 80 of the core pieces 77 are aligned at right angles to each other and are centrally slotted from their outer ends as at 81 for interlocking slotted engagement of the flanges 80. Thus, the flanges interlocked within the core barrel 78 form a framework which is square in cross section with the flanges forming diagonal trusses, each corner 82 of the square core barrel engages one edge 83 of the intersecting flange framework.

As seen in FIG. 13, each core piece 85 is formed from a flat length of material such as corrugated paper board. The ends 86 are cut in a rounded fashion with a radius of curvature substantially the same as the radius of the head 76. The length is scored laterally at its center along line 87 and intermediate lateral scorings 88 are made a distance from the ends equal to the radius of the head 76. The length is folded back upon itself along the center score line 87 to form a double thickness flange 80 between the intermediate score lines 88 and the center line 87. The ends of the length are then folded along the score lines 88 to a position perpendicular to the flange 80 to form the base 79 of the core piece 77. The flange 80 is then inserted through the slot 89 in the head 76 so that the flange 80 is extending inwardly perpendicular to the head with the base 79 of the core piece 77 along the outside of the head 76 to which it is secured by gluing or stitching.

The arrangement of the flange 80 extending through the slot 89 provides an easy method of maintaining the blank 85 in its folded position and stabilizes the flange 80 against pivoting with respect to the base 79.

As seen in FIG. 13, the length 85 is cut out at the center of each of the intermediate lines 88. This cut-out 90 is semi-circular at 91 on the base portion of length and is rectangular at 92 on the flange portion of the length. These cut-outs 90 combine when the blank is folded so that the semi-circular portions 91 form a central hole 93 in the base 79 and the rectangular portions 92 form a slot 94 in the flange 80 overlying the hole 93.

This permits the reel assembly 75 to be mounted on a jig or between two concentric shafts 95 as seen in FIG. 10.

The length 85 is longitudinally slotted at its center. This longitudinal slot 96 consists of an enlarged central portion 98 and reduced outer portion 97 extending therefrom. This slot 96 forms the open-ended slot 81 in the flange 80 when the length 85 is folded and the enlarged center portion 98 overlays the hole 93 and slot 94 so as not to interfere when mounted on the shafts 95.

With the construction of embodiment "C," the pieces necessary to form the reel assembly 75 may be stored and shipped unfolded as flat pieces, reducing the space occupied by each reel. No skill is required to assemble the reel and it can be done readily at the point of use. To facilitate assembly, the corners 99 of the flanges 80 are tapered so as to guide the flanges through the slots 89 and into the core barrel 78. The central slot 96 is also tapered at the juncture of the enlarged outer portions 98 and the outer portions 97 to facilitate interengagement of the slots 81 of the flanges 80. The ends 97 of the slot 96 are approximately as wide or slightly narrower than twice the thickness of the blank 85 to provide a friction fit when the slots of the folded flanges 80 interengage and the slots 81 formed by the slots 96 extend about half the length of the flanges 80 so that the ends of the flanges will abut the opposite head 76 to rigidify and add strength to the framework.

This construction provides a rigid and strong core and further reinforces the strength of the heads 76 because of the attachment thereto of the bases 79 of the core pieces, providing a double head strength.

Embodiment "D" combines the features of the above described embodiments "A," "B," and "C" as it utilizes the basic concept of the interlocking core and core barrel construction of embodiment "A," the two-flange core modification of embodiment "B" and the folded core piece principle of embodiment "C." In addition, embodiment "D" incorporates a cover construction extending between the heads and enclosing the interior of the reel assembly to form a complete and compact package which can be stored and shipped without the necessity of an additional container.

As illustrated in FIGS. 14 through 26, reel assembly 100 is seen to consist of a pair of interlocking core pieces 101, a pair of spaced heads 102, and an encircling cover 103.

Each core piece 101 consists of a pair of spaced flanges 104 with an intermediate base portion 105 and outer base portions 106. Each flange 104 is provided with a pair of slots 107 extending from the ends 108 of the flanges substantially half the distance to the intermediate base portion 105. The slots 107 are spaced apart a distance substantially equal to the width of the intermediate base 105 so that when the flanges of one core piece are aligned at right angles to the flanges of the other core piece, the slots 107 will be aligned for interengagement. The slots 107 are of a width equal to or slightly less than the thickness of the flange 104 so that when the flanges interengage in the slots, there will be a friction-fit holding the core pieces 101 together.

FIGS. 16, 17, and 18 illustrate the one-piece construction of the core pieces 101. It is seen that each core piece may be formed from a single length 110 which is laterally double scored along the lines 111 at a point spaced from the ends of the length to form the outer base portions 106. A central hole 112 is cut at the mid-point of the length 110 and the length is laterally scored along lines 113 which are spaced from the center of the length to form the intermediate base portion 105 of the core piece 101. The length 110 is also scored intermediate the score lines 111 and 113, as at 114, so that when the length is folded along the lines 114, the double thickness flanges 104 will be formed. The distance between the lines 114 and 113 is slightly less than the distance between the lines 114 and 111 so that when the length 110 is folded, as seen in FIG. 17, the intermediate base portion 105 will be recessed with respect to the outer base portions 106 to accommodate the head construction 102 which will be described below.

As seen in FIG. 16, the slots 107 are formed in the length 110 extending on both sides of line 114 and having an enlarged center portion which forms the tapered ends 115 when folded. These tapered ends facilitate the interengagement of the flanges. Also, the edges of the length 110 are tapered inwardly at the scoring 114 to facilitate guiding the flanges 104 into the core barrels described below.

FIGS. 19 through 23 illustrate the head construction 102 and the manner in which it is formed from a single blank. The head 102 is formed with an octagonal-shaped center portion 118 which has a central hole 119 and a pair of parallel slots 120 spaced equally distant from the center hole 119 and shaped to receive a folded core piece 104. Extending from opposite ends of the center portion 118 are end portions 121, each shaped as half a center portion 118 and with a semi-circular recess 122 at the mid-point of its outer end. The juncture of the center portion 118 and each outer half 121 is double scored as at 123 with the scoring spaced approximately a triple thickness of the material so that when the halves 121 are folded back upon the center portion 118, they will be spaced from the center portion at their juncture therewith.

Diagonal score lines 124 extending from the ends to the sides 127 of the center portion 118 complete the octagonal periphery of the center portion, and the tab 125 extending away from the scoring 124 is cut along the side 126 of the outer half 121 so that the tabs 125 may be folded along the lines 124 to lie on the center portion 118 as seen in FIG. 20. The head 102 is then ready to receive a core piece 101. The core piece 101 is mounted on the head 102 by inserting the outer base portions 106 of the core piece 101 through the slots 120 and folding the outer base portions 106 to lie along the center portion 118 of the head 102 between the tabs 125. This is shown in dotted lines in FIG. 23. The outer halves 121 the head 102 are then folded back and secured to the bases of the core piece and the center portion of the head by gluing or by staples 128. This is illustrated in FIG. 21 where it is seen that the semi-circular recesses 122 overlie the central opening 119 to form a shaft receiving hole in the reel assembly 100. The intermediate base portion 105 of each core piece 101 abuts the inner side of the head 102 as shown in FIGS. 15 and 22.

The triple thickness double scoring 123 at the juncture of the center head portion 118 and outer halves 121 form radially extending cavities 130 in the heads 102 along alternate edges of the octagonal periphery. These cavities 130 are provided to receive the flaps 131 of the cover 103. The cover 103 is formed from a blank of material having a length equal to the circumference of the head 102 and having eight lateral scoring lines 132 and 133. The first scoring line 132 at each end of the cover is spaced from the end one-half the length of a side of the head 102. The other scorings 133 are all spaced a length substantially equal to the length of a side of the head 102. The flaps 131 are formed with inwardly tapering sides 134 so that they are easily insertable in the cavities 130. Half flaps 129 are formed on the end portion 135 of the cover and the full flaps 131 on each alternate segment 136 of the cover so that the flaps 129 and 131 are positioned adjacent the cavities 130.

The cover is attached to the reel assembly 100 by first inserting the half flaps 129 of one end 135 in cavities 130 of the heads 102. The cover is then wound around the periphery of the heads 102 and the flaps 131 are sequentially inserted in the cavities 130 as the cover is wound on the head. The two ends 135 of the cover end up abutting each other with their flaps 129 mounted in the same cavity 130. The cover is secured in place by attaching the two end portions 135 as by tape, gluing, or stitching. A single piece of tape can be used to hold the entire cover in place.

This cover construction provides a compact package and eliminates the need for a container in which to store and ship the reels. It requires a minimum of material and utilizes the heads 102 as a portion of the package. Further, as seen in FIG. 15, the edges 137 of the segments 138 of the cover 103, which are intermediate the segments 136 having the flaps, extend slightly beyond the head 102 to provide a slight ridge which overlaps adjacent reel assemblies when the units are vertically stacked, thus providing an interlocked stack to greatly increase the stackability of the reels.

Not only does the cover 103 serve to form a package for the protection of the product mounted on the reel, but it also serves a structural function in that it reinforces the outer edges of the reel which is especially important when a large diameter reel is only partially wound with product where the edges of the heads 102 would normally be susceptible to damage.

The reel assembly illustrated in FIGS. 14 through 26 is an extremely strong construction having heads 102 of triple thickness as the bases 106 of the core pieces 101 in effect add a thickness to the strength of the head. The flanges 104 are of double thickness and can be further reinforced by a core barrel as illustrated in FIGS. 24, 25, and 26. This core barrel can be of any one of several constructions. FIG. 24 illustrates a barrel 140 which is octagonal in cross section having sides 141 extending between the adjacent edges 142 of the core piece framework. FIG. 25 shows a core barrel 143 which is circular in cross section and FIG. 26 shows a core barrel 144 formed from a hollow corrugated log. This latter core barrel construction can be of any thickness depending on the core strength desired.

Embodiment "E" is a construction similar to the core construction of embodiment "B" in which the core structure is used as a load bearing member rather than the core for a reel assembly. The strength obtained in the cores of the reel assembly is sufficient to provide a load bearing member which can support such heavy items as loaded pallets. The strength of the unit can be increased by increasing the strength and thickness of the individual elements such as by utilizing the double thickness folded core piece constructions of embodiments "C" or "D."

The load bearing structure 150 of embodiment "E" is illustrated in FIGS. 27, 28, and 29 which illustrates a pair of interlocking members 151 each having two flange portions 152 and an intermediate base portion 153. As seen in FIG. 29, each interlocking member 151 may be formed from a flat blank of material such as corrugated paper board which is scored along lines 154 intermediate its ends to form the intermediate base 153 therebetween, with the flanges 152 formed between the score lines 154 and the ends 155. A pair of spaced open-ended slots 156 are formed in each flange 152 extending inwardly from the outer ends 155. These slots are spaced apart a distance equal to the dimension of the base portion 153 between flanges 152, so that when the flanges are folded perpendicular to the base 153 and aligned at right angles to the flanges of the other support member 151, the slots 156 of one support member 151 will be aligned for interengagement with the slots of the other support member. The slots 156 extend approximately one-half the length of the flanges 152 so that when interlocked, the ends 155 of the flanges of one support member will abut the base 153 of the other support member. The slots 156 are of a thickness slightly less than the thickness of the blank so that the two support members 151 will interengage in a friction fit.

The interlocked support members 151 are surrounded by a band 157 which in the embodiment illustrated is octagonal in horizontal cross section, with each side 159 of the band extending between adjacent edges of the flanges 152 of the interlocking support members 151.

This band 157 serves to hold the interlocking support members in place and also increases the load bearing strength of the unit.

As seen in FIGS. 27 and 28, the top of the band 157 has tabs 158 extending perpendicularly from each side 159. These tabs 158 may be secured to the structure to be supported such as a pallet shown in dot-dash lines in FIG. 27. The attachment may be by gluing, stitching, or taping.

From the above it is apparent that the construction of the present invention can be utilized as a load bearing member for many purposes limited only by the strength of the load bearing unit which can be varied in thickness to provide almost any desired strength. It is compact and is easily portable for versatile use. Further, the construction is simple and susceptible to disassembly for storing or shipping in flat pieces.

Embodiment "F" is a reel assembly having a core construction similar to the cover construction of embodiment "D." It uses a core barrel of the same shape as the above described cover construction and has support members at the center of the heads which support the core barrel and form cavities to receive the mounting flaps, the cavities being similar to the cavities in the reel heads which receive the cover flaps. This construction, when incorporated with the criss-cross core framework of embodiment "B," forms an exceedingly strong core construction. Further, the support members also reinforce the centers of the heads to provide additional strength to protect the reel assembly, especially when mounted on a shaft with a heavy product load. The construction is simple and compact, is easily assembled and disassembled, and lends itself to a foldable construction wherein the component pieces may be stored and shipped flat.

The variations of embodiment "F" are illustrated in FIGS. 30 through 42. The basic reel construction is illustrated in FIGS. 30 through 34, a more complex core barrel and head in FIGS. 35 through 37 and a variation illustrating the combination core construction of FIGS. 28 through 42.

Referring first to the basic construction of FIGS. 30 through 34, the reel assembly 165 is seen to consist of heads 166, support members 167, and a core barrel 168. The heads 166 may be of any desired shape and are provided with central holes 169 for mounting of the reel assembly on a shaft. Secured to the interior side of each head 166 is a support member 167 which is centrally positioned and has an opening 170 overlying the opening 169 of the head 166.

As seen in FIG. 32, each support member 167 consists of a base 170 and corner tabs 171. The base 170 has an octagonal periphery with the four corner tabs 171 extending from alternate sides and with the outer ends 172 of the tabs tapering to outer points 173. The support member 167 is scored along the juncture line 174 of the corner tabs 171 to permit the tabs to be folded inwardly to lie along the support member as shown in dotted lines in FIGS. 31 and 32. When so folded, the support member 167 is placed on the head 166 with the base 170 spaced from the head 166 by the folded tabs 171. The tabs are secured to both the head 166 and the base 170 by gluing or stitching. When mounted in this manner, cavities 175 are provided extending inwardly from alternate edges of the base 170 of the support member 167. These cavities 175 receive the mounting flaps 176 and 177 of the core barrel 168 which is shown in the unfolded position in FIG. 34. The core barrel 168 is formed from a blank of material such as corrugated paper board of a length equal to the periphery of the octagonal base 170 of the support member 167 and is scored laterally along eight spaced lines. There are first and last score lines 178 spaced a distance from each end 179 of the core barrel equal to one-half the length of a side of the base 170, the other six scorings 180 are equally spaced from each other and from the end score lines 178, each space being equal to the length of a side of the base 170. The mounting flaps 176 extend from each side of the end segments of the core barrel 168 and the mounting flaps 177 extend from each end of alternate intermediate segments of the core barrel. These flaps are tapered outwardly as at 181 to facilitate insertion in the cavities 175 and the end flaps 176 are each shaped as half of an intermediate flap 177 so that the end flaps will mate to form a complete flap.

The core barrel 168 is attached to the heads and support members by first inserting the end flaps 176 on one end of the core barrel into cavities 175. The core barrel is then wrapped around the support member with the flaps 177 being sequentially inserted in the cavities 175. The tabs of the other end of the core barrel are inserted in the same cavity as the tabs of the first end to completely surround the support members and form a core barrel. The core barrel is held in place by simply taping or stitching the ends together.

An alternate construction of the support member is illustrated in FIG. 33 wherein the support member 182 is shown to be originally square with diagonal scorings 183 across each corner so that when the corners 184 formed by the scorings are folded over along the base 185, the support member 182 will have an octagonal periphery and the corners 184 will space the base 185 from the head 166 to provide the necessary cavities for receipt of the core barrel tabs.

The above described embodiment "F" may be modified to provide additional strength to both the heads and the core barrel. The modification is illustrated in FIGS. 35, 36, and 37. The core barrel 190 is formed from a blank of material such as corrugated paper board and is scored similar to the core barrel of FIG. 34 with scorings 191 adjacent each end and spaced therefrom half the length of a side of the support member 192. The other six lateral scorings 193 are spaced a distance equal to the lengths of the sides of the support member 192. Mounting flaps 194 extend from each side of the end segments 195. These end flaps 194 each are shaped as one-half of the intermediate mounting flaps 196 which extend from alternate segments of the core barrel 190, thus the end flaps 194 will continue to form a flap similar to the flaps 196 when the core barrel is wound on the support members 192. The flaps 196 are triangular in shape and the material between adjacent flaps has not been cut away, but rather forms reinforcing flanges 197 with outwardly flaring edges 198. These flanges 197 are of a height equal to the distance between the edge 199 of support member 192 and the outer edge 201 of the head 200 so that when the core barrel 190 is mounted on the support members 192 with the flaps 194 and 196 in the cavities between the support member 192 and the head 200, the flanges 197 may be folded to extend outwardly along the head to the outer edge 201 of the head. The flanges 197 have tapered corners 202 which mate with the corners of the head 200. This core barrel construction which includes the flanges 197 not only reinforces the head 200 by increasing the thickness thereof, but also reinforces the attachment of the core barrel to the heads and support members and helps to provide a snug fit of the flaps in the cavities. Further, the flanges 197 prevent the product wound on the reel from slipping down between the core barrel and head.

The head 200 of the reel assembly of FIGS. 35, 36, and 37 has an octagonal periphery with four flaps 203 extending from alternate edges. Each of these flaps 203 converge to an outer edge 204 which is spaced from the edge 201 of the octagon a distance equal to the space between the edge 201 and the edge 199 of the support member 192 so that when the flap 203 is folded inwardly, the outer edge 204 will be adjacent the edge 199 of the support member.

The outer edge 204 of the flap 203 has a centrally located outwardly extending tip 205 which is received in a similarly shaped recess 206 in the edge 199 of the support member. The flaps 196 of the core barrel 190 are provided with centrally located slots 207 at the juncture with the adjacent segment of the core barrel. These slots 207 are shaped similar to the recesses 206 in the support member to similarly receive the tip 205 of the head flap 203 when the core barrel 190 is mounted in the reel assembly and the flap 203 folded inwardly. The receipt of the tip 205 is facilitated by providing slits 208 in the segments of the core barrel 190. These slits 208 extend inwardly from each end of the slots 207 so that the portions of the segments between the slits 208 will be displaced by the tip 205 of the head flap when it is folded into position and when the tip 205 has passed beyond the segment, the portions between the slits 208 will spring back to their normal position thereby latching the head flaps 203 in their folded position. These head flaps 203 reinforce the strength of the head 200 by increasing the thickness thereof and further serve to hold the core barrel in place. The tip 205, recess 206, slot 207, and slits 208 provide a means for latching the head flaps in place without the necessity of stitching, gluing, or taping, thus providing a simple and inexpensive method of construction.

A further modification of embodiment "F" is illustrated in FIGS. 38 through 41 which combines the core barrel construction of embodiment "F," the criss-cross slotted flange core construction of embodiment "B," and the cover construction of embodiment "D." The resulting reel assembly has a core strength which can support heavy loads and withstand excessive force without failure. The head strength is reinforced by the support member construction of embodiment "F" and also by the head construction itself which will be described. The head is designed to provide cavities for the receipt of a cover which serves the same purpose and reinforces the reel assembly in the same manner as the cover of embodiment "D."

The reel assembly 210 consists of a pair of spaced heads 211, a core construction 212, and a cover 213. The interior of the core construction consists of a pair of core pieces 214 each adjacent to one of the heads 211 and each having a pair of slotted flanges with the flanges 215 of one core piece extending into perpendicular engagement with the slotted flanges 216 of the other core piece. This provides a strong rigid interior core having the same characteristics as the core construction of embodiment "B." Surrounding the interior core is the core barrel 217 having seven intermediate segments 218 each of a length equal to the distance between the flanges 215 and 216 of the interior of the core and having end segments 219 which are each half the distance between flanges so that when the core barrel 217 is wound on the interlocking flanges 215 and 216 it will completely surround the interior of the core and the end segments 219 will meet to form a full segment. The segments are all formed by lateral score lines 220 which facilitate the folding of the core barrel 217 from a flat length of material such as corrugated paper board.

The end segments 219 are formed with flaps 221 and the alternate intermediate segments 218 are formed with flaps 222. The intermediate flaps 222 have converging edges 223 and the end flaps 221 have one diagonal edge 224 so that when the end segments 219 meet as described above their flaps 221 will combine to form a full flap similar to the intermediate flaps 222. The flaps 221 and 222 are formed by cutting the length of material along the lines 223 and 224. The material between flaps is not removed but forms flanges 225 with diverging edges.

The core barrel 217 is mounted to the heads 211 by means of support members 226 which have octagonal peripheries and have four tabs 227 extending from alternate corners which are folded inwardly to space the support member 226 from the head 211 when the tabs 227 are secured to the head 211. Thus, cavities are formed along the intermediate edges 228 of the support member between the head 211 and support member 226 for the receipt of the flaps 221 and 222 of the core barrel 217. The intermediate flanges 225 of the core barrel extend outwardly along the head 211 to reinforce the head and provide the snug fit of the core barrel 217 on the core head 211 as will be described.

Each head 211 consists of a central octagonal portion 229 with end pieces 230 extending from two diametrically opposed sides 231 of the central portion. These end pieces 230 are each shaped as half of an octagon with the same dimensions as the center portion 229, and are interiorly cut away as at 232 in the shape of half of an octagon with the same dimensions as the periphery of the support member 226 so that when the end pieces 230 are folded back to lie along the central portion 229, the end pieces 230 will meet to form an octagonal ring lying along the center portion 229 between the support member 226 and the periphery of the central portion.

The head 211 may be formed from a flat length of material such as corrugated paper board as illustrated in FIG. 40 and, when so done, the excess portions 233 and 234 of the length adjacent the end pieces 230 may be folded over along the end pieces and cut to conform to the edges thereof to add a thickness to the head and increase the strength thereof. The junctures between the opposed edges 231 and the end pieces 230 are double scored with the scoring separated a distance approximately three board thicknesses so that when the end pieces 230 are folded over along the central portion 229 with the adjacent portions 233 and 234 therebetween, the double scoring will provide cavities along the adjacent edges 235 of the central octagonal portion for the receipt of flaps of the cover 213.

The cover 213 is identical to the cover described in embodiment "D" and is seen in FIG. 38 to be divided into segments with tapered flaps extending from alternate segments. The intermediate segments 237 are of the same length as the side of the head 211, and the end segments 238 are half the size of the intermediate segments 237 so that when the cover is wound on the head, the end segments will meet along one side of the head 211. The end segments 238 are secured together on the head as by stitching or taping thereby forming a complete enclosure for the protection and storing of a product.

The flaps 236 of the intermediate segments 237 and the flaps 239 of the end segments 238 extend into the cavities a sufficient distance so as to abut the outer edges of the flanges 225 of the core barrel 217, thereby locking the core barrel in place and further reinforcing the overall strength of the reel assembly.

This reel assembly 210 may be stored and shipped with the pieces separate and flat so as to minimize the space occupied. At the point of use, the interior core is first formed by perpendicular interengagement of the slotted flanges 215 and 216. The heads 229 with the support members 226 attached thereto are then aligned and the core barrel 217 is partially wound thereon. The interior core 214 is then placed within the core barrel and the winding of the core barrel onto the support members is completed. The outer ends 230 of the heads are then folded over with the adjacent excess portions 233 and 234 folded therealong and the ends 230 are attached to the central portion 229 by stitching, gluing, or taping. The product is then wound on the core barrel 217 with the flanges 225 preventing slippage of the product between the core 212 and heads 211. After the product is wound on the reel assembly, the cover 213 is attached to the periphery of the head 211 and the completed package is ready for shipment or storing.

Embodiment "G" is a variation of the invention incorporated in embodiment "E" in that it provides a reel assembly having a core barrel attached to the head by engagement of tabs of the core barrel in slots formed in the heads. However, embodiment "G" can be manufactured from rigid material such as metal, wood, or plastic so that great strength can be provided and yet the compact storage and easily assembled and disassembled features are retained.

The structure of this embodiment is illustrated in FIGS. 43 through 48. The perspective view of FIG. 43 shows a reel assembly 250 having heads 251 and a core barrel 252. The core barrel 252 is attached to the heads 251 by wedging engagement of tabs 253 on the core barrel in slots 254 in the heads 251.

The heads 251 may be formed from any material such as metal, plastic, or wood. When formed of metal, center holes 255 are stamped out for mounting on a shaft and the slots 254 are formed adjacent the position of the core barrel tabs 253. These slots 254 are formed by stamping portions of the metal heads inwardly. These stamped segments 256 are connected at their sides 257 to the heads and are disconnected at their outer edges 258 from the heads 251 to form the slots 254. The segments 256 are inclined toward the heads from the outer edges 258 to the inner edges 259, the inner edges being spaced from the heads a distance slightly greater than the thickness of the core tabs 253, and the outer edges being spaced a greater distance from the heads than the inner tabs so that the segments 256 will wedgingly receive the core tabs 253.

The core barrel 252 is formed of two halves 260 pivotally connected by a hinge 261 extending parallel to the axis of the reel. Each half 260 is semi-circular in vertical cross section and has a tab 253 at each end 263. The tabs 253 extend downwardly and outwardly from a base 264 recessed from the core end 263. The inclination of the tabs 253 provides wedging when the tabs are inserted in the slots 254 and the tabs extend beyond the inner edges 259 of the slot segments 256 into contact with the head 251 to form a tight fit therewith. This tight fit forces the ends 263 of the core barrel firmly against an adjacent annular bead 265 in the heads 251 to form a rigid reel assembly when the core halves 260 are secured together as by snap locks 266. The annular bead 265 adjacent the core barrel and another bead 267 formed in each head adjacent its periphery strengthen the flat heads and thus rigidify the reel.

Although the use of hinges 261 and locks 266 are illustrated, they may be dispensed with if desired. The halves 260 of the core barrel 252 may be held together simply by tape or by the initial winding of linear product on the reel assembly.

With the above construction, a heavy duty reel of great strength is provided which requires a minimum of parts and yet can be disassembled for storage and shipping prior to use and further can be disassembled and returned after the product has been removed.

When the head of the present reel assembly is made of wood or plastic, a support member 270 may be used in place of the above described stamped segment. This support member, as seen in FIGS. 47 and 48, consists of a central solid portion 271 which is secured to the center of the head and has a hole 272 overlying the hole of the head. Each support member 270 is formed with inwardly extending recesses 273 at its outer periphery. These recesses 273 are open on the side adjacent the head so that when the support member 270 is secured to the head, the recess 273 will form cavities between the head and support member for the receipt of tabs 274 of the barrel 277. The recesses have tapered sides 275 which are inclined the same as or slightly greater than the tapered sides 276 of the core barrel tabs 274 so that the tabs may be wedged therein. The resulting cavities are slightly deeper than the length of the core barrel tabs so as not to obstruct the wedging. The support member 270 illustrated in FIG. 47 is provided with four recesses 273 and the core barrel 277 is divided into four individual segments 278 each having tabs 274 at both ends. The core barrel segments 278 are individually mounted to the heads and are subsequently attached together by tape or by the initial winding of the linear product. The number of segments 278 may be varied from two to as many as desired. With larger reels, it is more feasible to use several segments to keep the size of pieces as small as possible.

This reel assembly may be varied in strength to support extremely heavy loads and is of wide scope in that reels of this construction may be used for small sizes and for very large sizes. The disassembling feature is something which is not presently incorporated in the conventional reels and thus is a great advantage.

From the above description of the several embodiments, it is apparent that the present invention provides reel assemblies which are easily assembled and disassembled so that they may be stored and shipped as separate pieces and yet their construction is simple and inexpensive. Further, the core construction utilized in these reel assemblies is of universal adaptation for purposes other than reel assemblies, such as independent load bearing members.

I claim as my invention:

1. A reel assembly, comprising: a pair of spaced end pieces; a support member attached to each end piece having a square base contiguous with the end piece and four rectangular sides extending perpendicularly from the base, each side having a pair of open-ended slots perpendicular to the base, the support members being interlocked by engagement of the slots of one member with the slots of the other member, the sides of the support members intersecting symmetrically to form a framework having eight equidistant outstanding corners; and an octagonal band surrounding said framework and extending between end pieces, the corners of said octagonal band being contiguous with the outstanding corners of said framework.

2. A reel assembly, comprising: a pair of square spaced end pieces having corners folded inwardly to form an equilateral octagonal periphery, the folded corners of one end piece overlapping the folded corners of the other end piece and securable thereto to fix the position of the end pieces; a support member attached to each end piece having a square base contiguous with the end piece and concentric therewith, the corners of said base being aligned with alternate corners of the octagonal periphery of the end piece, and four rectangular sides extending perpendicularly from the base, each side having a pair of open-ended slots perpendicular to the base, the support members being interlocked by engagement of the slots of one member with the slots of the other member, the sides of the support members intersecting symmetrically to form a framework having eight equidistant outstanding corners, each corner aligned with a corner of the octagonal periphery of the end pieces; and an octagonal band surrounding said framework and extending between end pieces, the corners of said band being contiguous with the outstanding corners of the framework and the sides of the band being parallel to the peripheral edges of the end pieces.

3. The reel assembly of claim 2 wherein the end pieces, support members and band are formed by cutting, scoring and bending flat pieces of corrugated paper board.

4. The reel assembly of claim 2 wherein each support member is formed from two pieces of corrugated paper board, each piece having a base and two sides, the resulting support member having four sides and a double thickness base.

5. A method of constructing a reel assembly from corrugated paper board, comprising: cutting out two end pieces; cutting out two support members, each having a base and a plurality of rectangular flanges extending therefrom; cutting two open-ended slots in the outer edge of each flange; securing the base of one support member to one end piece and the base of the other support member to the other end piece; bending said flanges perpendicular to said base to form sides; aligning the slots of one support member with the slots of the other support member with sides of the support members intersecting; and pressing the support members together, interengaging the slots and interlocking the support members.

6. A method of constructing a reel assembly from corrugated paperboard, comprising: cutting out two square end pieces; cutting out two support members having square bases and rectangular flanges extending from the sides of the square; scoring the sides of the square; cutting two slots in the outer edge of each flange perpendicular to the adjacent side of the square base; securing the base of each support member to an end piece so that the base and end piece are concentric and the corners of the base are aligned with alternate corners of the equilateral octagon of the end piece; bending the flanges of the support member along the scoring to a position perpendicular to the base to form sides for the support member, the slots having been cut so that each slot is equidistant from the adjacent slot on the adjacent side of the support member and from the slot on the same side of the support member; cutting a strip of corrugated paper board having a width equal to the distance the end pieces are to be spaced, and a length equal to the periphery of an octagon having the same distance from center to corner as the center to corner dimension of the square base of the support member; scoring the strip in eight equal rectangles; bending the strip along the scorings to form an octagonal band; securing the ends of the band together; mounting the band on one support member with alternate corners of the octagonal band contiguous with corners of the sides of the support member; and inserting the other support member into the band with corners contiguous with the other alternate corners of the octagonal band and the slots in engagement thereby interlocking the support members.

7. The method of constructing a reel assembly from corrugated paper board of claim 6 wherein four support members are cut out, each having a square base and two rectangular flanges, the sides of the squares adjacent the flanges are scored and the square bases of two support members are secured together to form a single support member having four flanges and a double thickness base, the other two support members being similarly combined to form a single support member.

8. In a reel, a core comprising: a pair of complementary support members each having a base and flat flanges secured to and extending perpendicularly from the base and each having slots at its free end receiving the flanges of the other support member to interlock the support members with each flange engaging a plurality of the flanges of the other support member to form a framework, a band member encircling said framework to form the reel core, and means at the centers of said bases defining aligned holes to receive a member to support the core for rotation about the axis of the holes.

9. A reel assembly, comprising: a pair of spaced head pieces each having a flange receiving slot therein and a pair of core pieces, each having a base lying against one side of one head piece and a slotted flat flange extending through said flange receiving slot of the head piece to the other side of the head piece, said flange of each core piece extending inwardly into the slot of the other core piece and interengaging the latter to interlock the core pieces together to form a rigid core between said head pieces.

10. A reel assembly, comprising: a pair of flat laterally spaced head pieces each having two layers constituting an inner portion and an outer portion, the inner portion having a flange receiving slot therein and a pair of core pieces each having a base secured between said inner and outer portions of one head and having a flat slotted flange extending inwardly through the slot in the inner portion, each flange extending into the slot of the other flange and interengaging the latter to interlock the core pieces together to form a rigid core between the head pieces.

11. A reel assembly, comprising: a pair of spaced head pieces; a pair of core pieces, each said core piece being formed from a single length of foldable material, said length being folded back upon itself to form a double thickness flange and the end portions of the length being folded away from each other and substantially at right angles to said flange to form a flat base, said flanges having open slots extending from their free end, said bases being secured to the head pieces and the flanges interengaging with their slots interlocking to form a rigid core between head pieces.

12. A reel assembly, comprising: a pair of spaced head pieces; a pair of core pieces, each said core piece being formed from a single length of foldable material, said length having a central portion, the length being folded at substantially right angles at each end of the central portion, the length being folded back upon itself along lateral lines spaced from said central portion to form a pair of double thickness flanges spaced by the central portion, the ends of said length being folded outwardly at substantially right angles to the flanges to form a flat base, said flanges having open slots extending from their free ends, said bases being secured to the head pieces and the flanges of one core piece interengaging the flanges of the other core piece with their slots interlocking to form a rigid core between head pieces.

13. A reel assembly, comprising: a pair of spaced head pieces, each said head piece having an inner portion and an outer portion, the inner portion having a pair of parallel spaced flange receiving slots therein; a pair of core pieces, each said core piece being formed from a single length of foldable material, said length having a central portion, the length being folded at substantially right angles at each end of the central portion, the length being folded back upon itself along lateral lines spaced from said central portion to form a pair of double thickness flanges spaced by the central portion, the ends of said length being folded outwardly at substantially right angles to the flanges to form a flat base, said base being secured between the inner and outer head portions and the flanges extending inwardly through the inner head piece slots, each flange having a pair of spaced open slots extending from its free end, the flanges of one core piece interengaging the flanges of the other core piece with their slots interlocking to form a rigid core between head pieces.

14. A method of constructing a reel assembly from corrugated paper board, comprising: cutting out two end pieces; cutting out two support members each having a base and at least one generally rectangular flange extending therefrom; cutting at least one open-ended slot in the other end of each flange; securing the base of one support member to one end piece and the base of the other support member to the other end piece; bending said flanges perpendicular to said bases to form sides; aligning the slot of one support member with the slot of the other support member with the sides of the support members intersecting; and pressing the support members together so as to interengage the slots and interlock the support members.

15. In a reel assembly, the combination of a pair of core pieces each formed of a length of foldable material and folded back upon itself to form a double thickness flat flange with the end portions of the length folded away from each other and substantially at right angles to said flange to form a flat base, each of said flanges having a flange to form a flat base, each of said flanges having a slot opening inwardly from its free end and receiving and interlocking with the other of the flanges to form a rigid core between said bases, and means at the centers of said bases defining aligned bearing means with a common axis to receive a member to support the core pieces for rotation about the axis.

16. In a reel assembly, the combination of a pair of core pieces each formed of a length of foldable material and folded back upon itself to form a double thickness flat flange with the end portions of the length folded away from each other and substantially at right angles to said flange to form a flat base, each of said flanges having a slot opening inwardly from its free end and receiving and interlocking with the other of the flanges to form a rigid core between said bases, a band encircling said rigid core to strengthen the core and extending between the bases to receive windings of a length of material thereon, and means at the center of said bases defining aligned bearing means with a common axis to receive a member to support the pieces for rotation about the axis.

17. A reel assembly comprising a pair of spaced end pieces lying in parallel planes and a pair of flat support members secured to the respective end pieces and lying in intersecting planes normal to the end pieces, said end pieces extending radially and outwardly beyond said support members and in the planes of the end pieces to form reel flanges and each support member being slotted along the intersection of said planes and receiving the other support member in each slot so as to interlock with the other support member in frictional gripping relation to form a framework between the end pieces.

18. A reel assembly comprising a pair of spaced end pieces lying in spaced parallel planes; a pair of flat support members secured to the respective end pieces and lying in intersecting planes normal to the end pieces, said end pieces extending radially and outwardly beyond said support members and in the planes of the end pieces to form reel flanges and each support member being slotted along the intersection of said planes and receiving the other support member in each slot so as to interlock with the other support member in frictional gripping relation to form a framework between the end pieces; and a band encircling said framework and extending the full distance between said end pieces to rigidify the framework and receive windings of a length of material thereon.

19. A reel assembly comprising a pair of flat parallel laterally spaced end pieces; a pair of support members, each support member having a base secured to one of said end pieces and a flat side extending inwardly therefrom in a plane normal to said end pieces and intersecting the plane of the side of the other support member, said end pieces extending outwardly beyond said sides and said sides being slotted along the intersection of said planes and interlocking with each other in frictional gripping relation to secure the support members together to form a framework between the end pieces.

20. A reel assembly, comprising a pair of flat parallel laterally spaced end pieces; a pair of support members, each support member having a base secured to one of said end pieces and a flat side extending inwardly therefrom in a plane normal to said end pieces and intersecting the plane of the side of the other support member, said end pieces extending outwardly beyond said sides and said sides being slotted along the intersection of said planes and interlocking with each other in frictional gripping relation to secure the support members together to form a framework between the end pieces; and a band encircling said framework and extending the full distance between said end pieces to rigidify the framework and receive windings of a length of material thereon.

21. A reel assembly comprising a pair of flat parallel laterally spaced end pieces; a pair of support members, each support member having a base secured to one of said end pieces and a plurality of flat sides extending inwardly in planes substantially perpendicular to said end piece and intersecting the planes of the sides of the other support member, each side having open-ended slots extending from the free end and interlocking with the slotted sides of the other support member in frictional gripping relation to form a framework disposed between the end pieces and securing the same together.

22. In a reel, a core comprising a pair of complementary support members each having a flat base and at least one flat flange secured to and extending perpendicularly from the base and formed at its free end with a slot receiving the flange of the other support member so that the support members interlock and form a rigid framework, a band encircling said framework to form the reel core, and means at the centers of said bases defining aligned holes to receive a member to support the core for rotation about the axis of the holes.

23. A reel assembly comprising a pair of laterally spaced flat heads each having parallel flange receiving slots extending through the head from an outwardly facing side of the head to an inner side facing the other head and a pair of core pieces each having a base lying against said outwardly facing side of one base and two flat parallel slotted flanges extending through the slots in the head to the inner side thereof and into slots in the flanges of the other core piece so that the core pieces interlock frictionally to form a rigid core and hold the heads assembled to such core.

References Cited in the file of this patent

UNITED STATES PATENTS

| | | |
|---|---|---|
| 567,898 | Grimm | Sept. 15, 1896 |
| 671,446 | Lorscheider | Apr. 9, 1901 |
| 1,679,573 | Hind | Aug. 7, 1928 |
| 1,762,386 | Collingbourne | June 10, 1930 |
| 1,905,488 | Nack | Apr. 25, 1933 |
| 1,947,168 | Potter | Feb. 13, 1934 |
| 2,417,195 | Hargreaves | Mar. 11, 1947 |
| 2,497,556 | Olson | Feb. 14, 1950 |
| 2,527,819 | Janney | Oct. 31, 1950 |
| 2,527,842 | Mullaney | Oct. 31, 1950 |
| 2,591,576 | McCormick | Apr. 1, 1952 |
| 2,642,989 | Keiser | June 23, 1953 |
| 2,652,922 | Scheih | Sept. 22, 1953 |
| 2,728,449 | Rheinfrank | Dec. 27, 1955 |
| 2,812,854 | Fletcher | Nov. 12, 1957 |
| 2,832,466 | Sheard | Apr. 29, 1958 |
| 2,860,825 | Montgomery | Nov. 18, 1958 |

FOREIGN PATENTS

| | | |
|---|---|---|
| 363,103 | Germany | Nov. 4, 1922 |
| 322,643 | Great Britain | Dec. 12, 1929 |